Sept. 22, 1970         A. C. ROBINSON         3,529,358
PROCEDURE FOR HEAT TREATMENT OF MATERIALS
Filed June 19, 1969         10 Sheets-Sheet 2
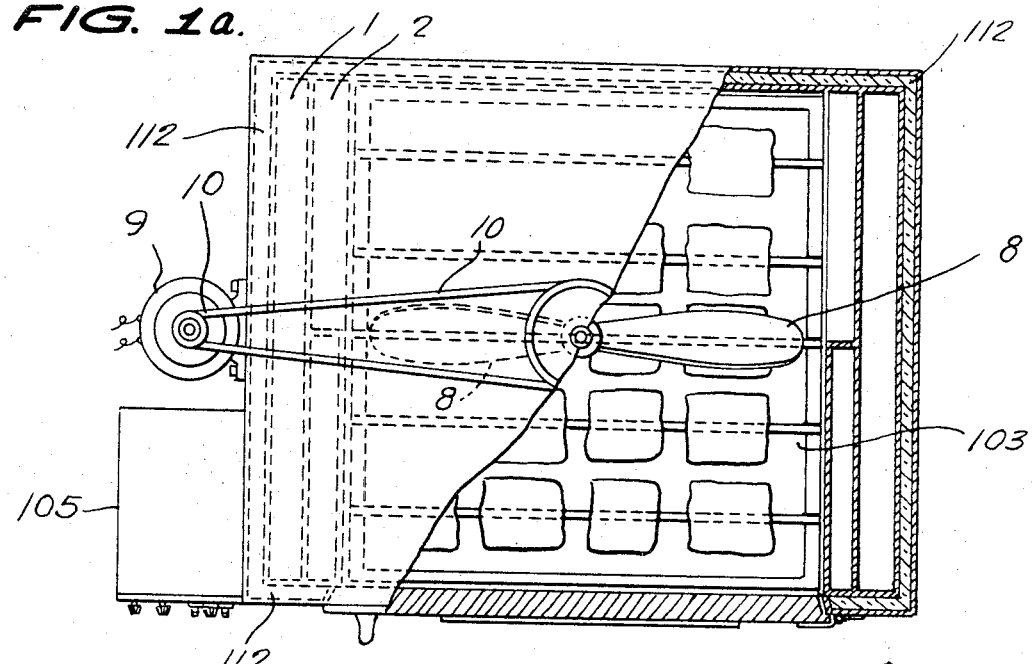
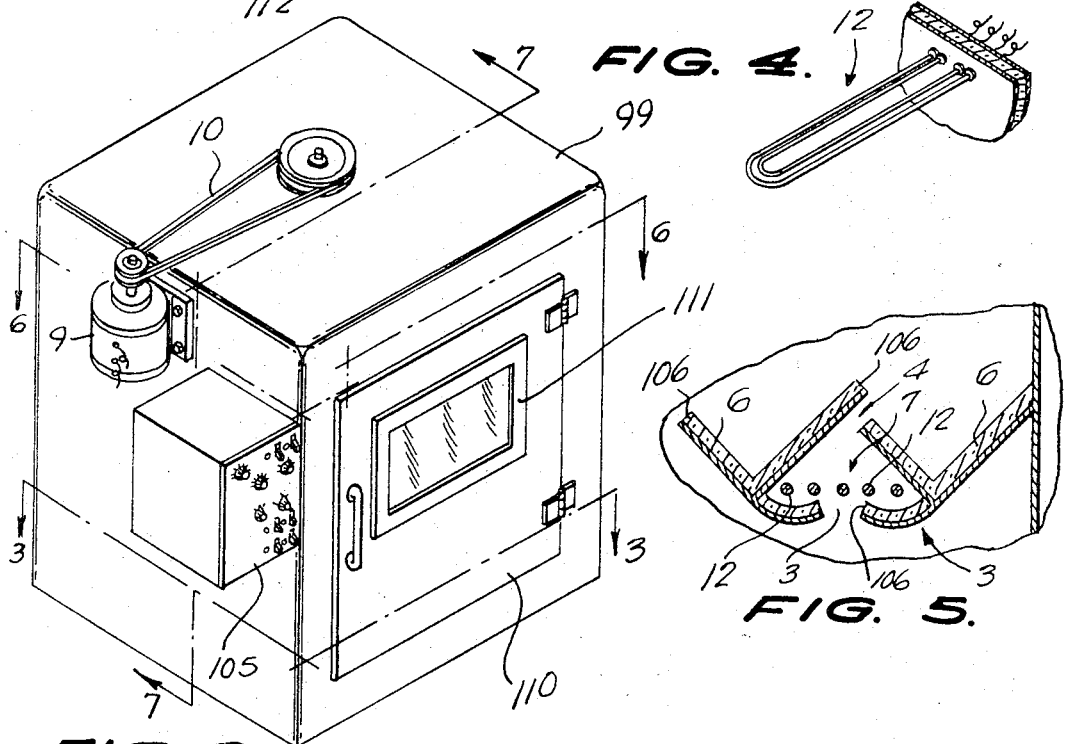
INVENTOR.
AUBREY C. ROBINSON,
BY
Linton and Linton
ATTORNEYS.

Sept. 22, 1970  A. C. ROBINSON  3,529,358

PROCEDURE FOR HEAT TREATMENT OF MATERIALS

Filed June 19, 1969  10 Sheets-Sheet 3

INVENTOR.
AUBREY C. ROBINSON,
BY
*Linton and Linton*
ATTORNEYS.

Sept. 22, 1970　　　　　A. C. ROBINSON　　　　　3,529,358
PROCEDURE FOR HEAT TREATMENT OF MATERIALS
Filed June 19, 1969　　　　　　　　　　　　10 Sheets-Sheet 4
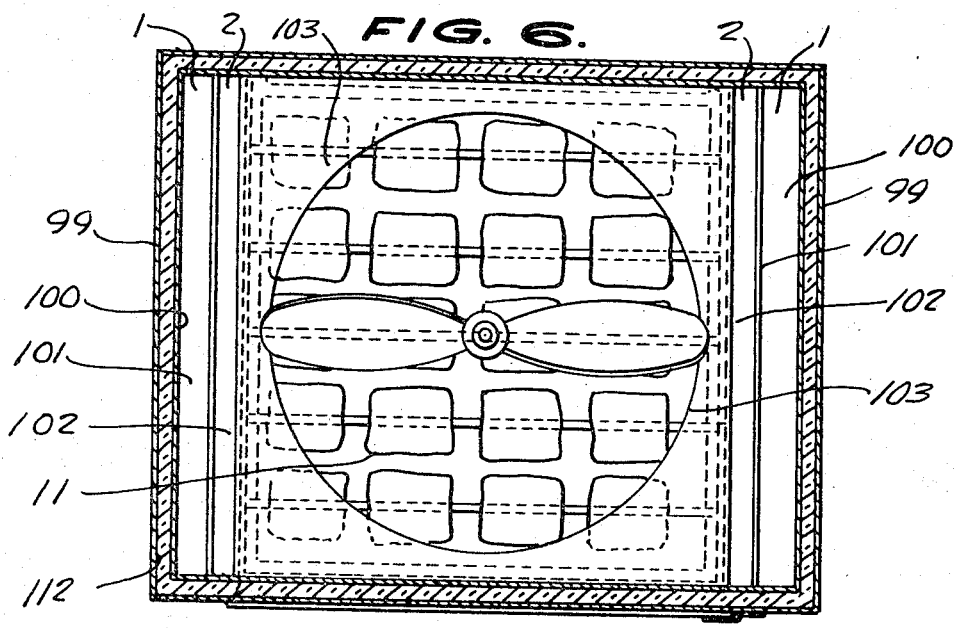
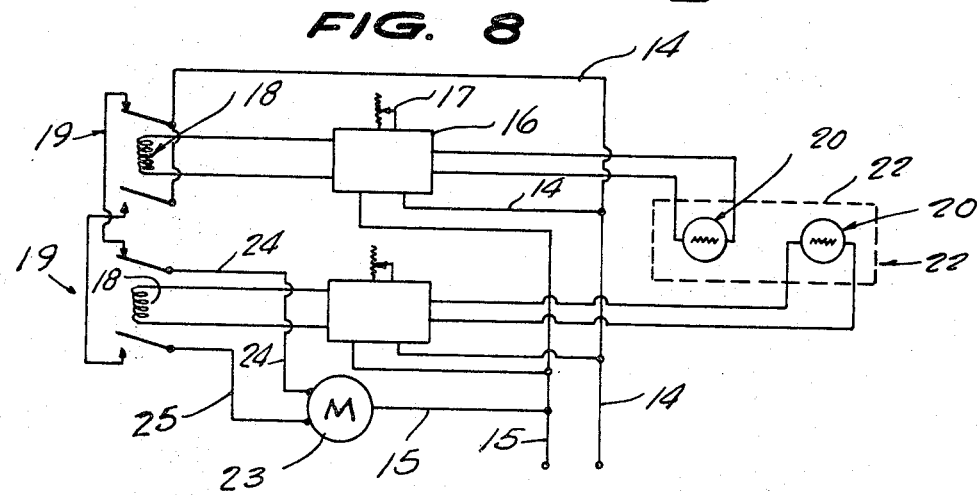
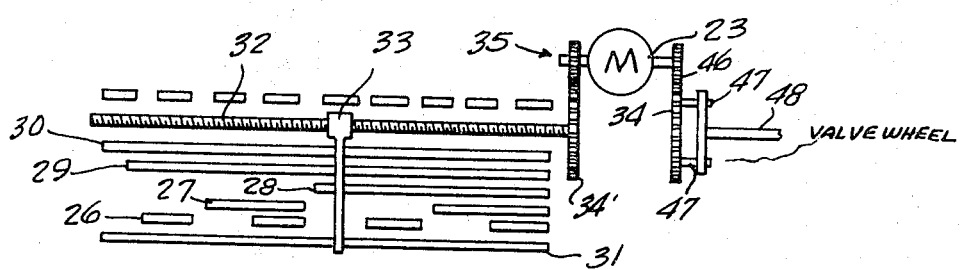
INVENTOR.
AUBREY C. ROBINSON,
BY
*Sinton and Sinton*
ATTORNEYS.

Sept. 22, 1970          A. C. ROBINSON          3,529,358
PROCEDURE FOR HEAT TREATMENT OF MATERIALS
Filed June 19, 1969          10 Sheets-Sheet 5
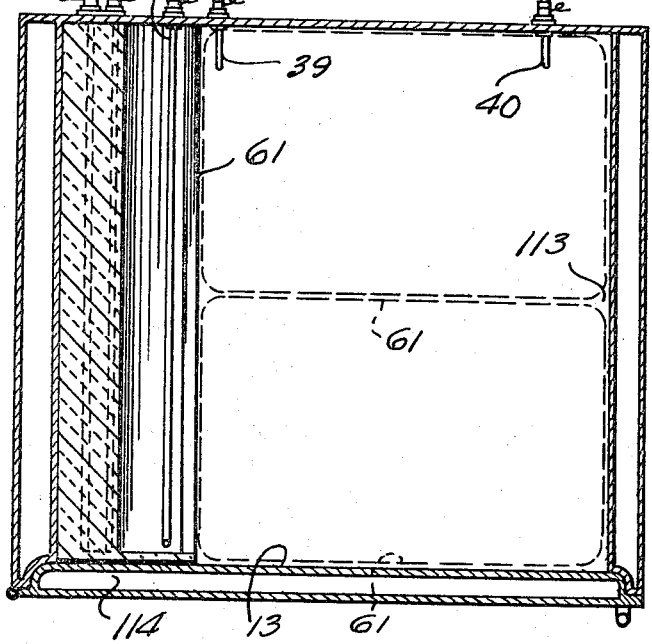
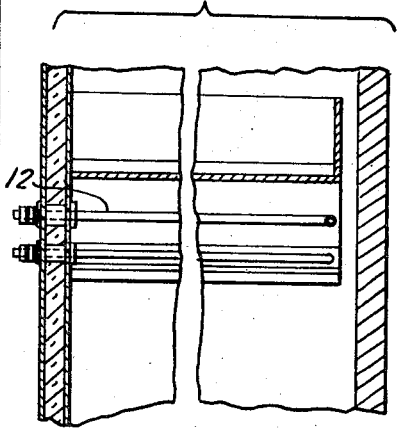
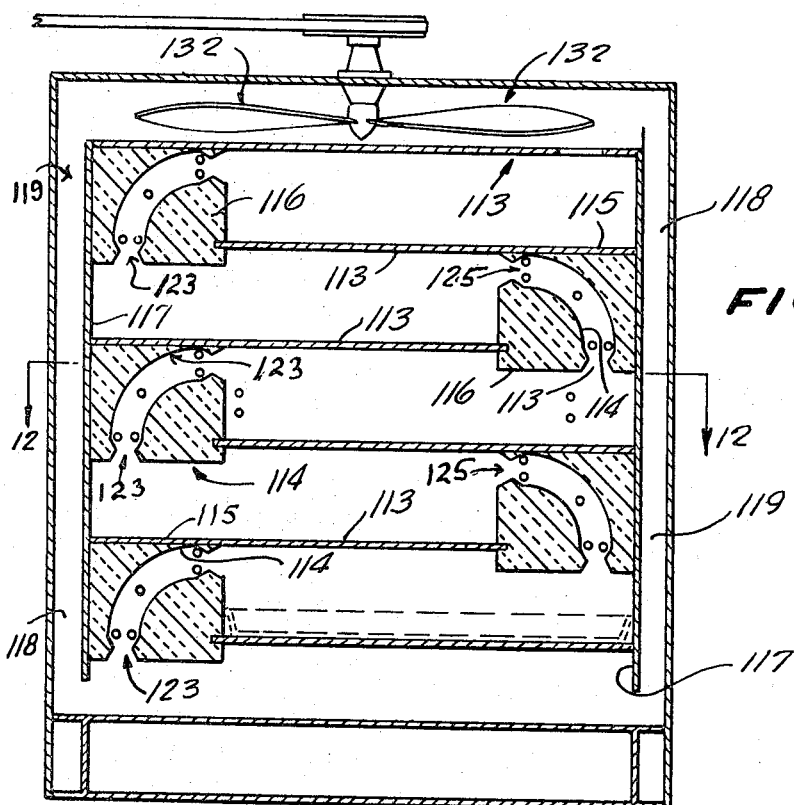
INVENTOR.
AUBREY C. ROBINSON,
BY
Linton and Linton
ATTORNEYS.

Sept. 22, 1970            A. C. ROBINSON            3,529,358
PROCEDURE FOR HEAT TREATMENT OF MATERIALS
Filed June 19, 1969            10 Sheets-Sheet 6
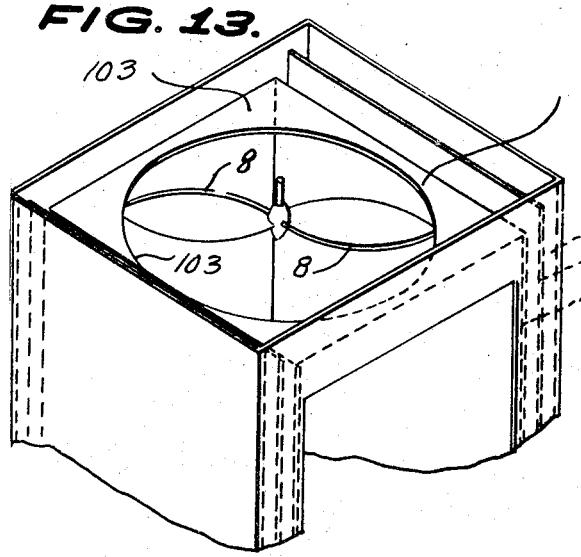
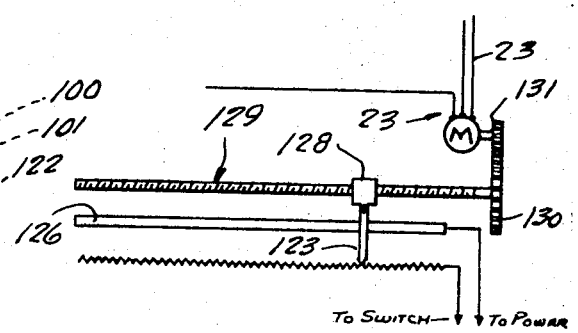
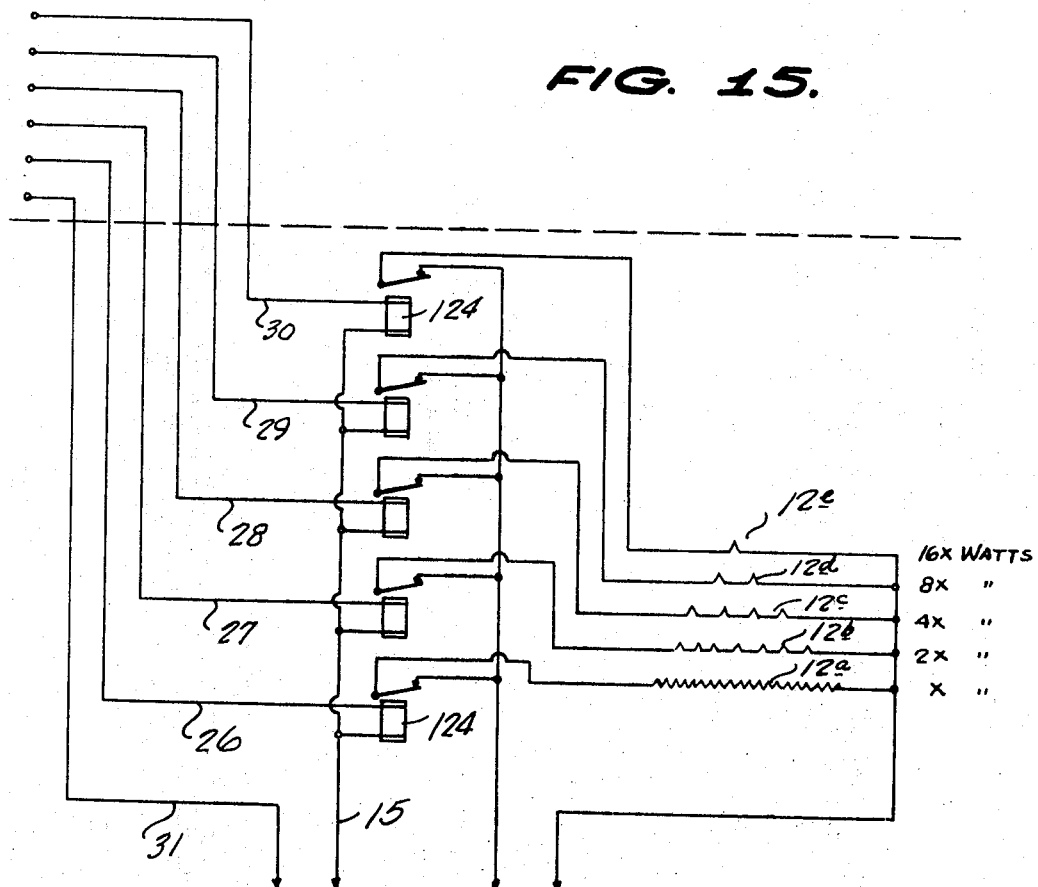
INVENTOR.
AUBREY C. ROBINSON,
BY
Sinton and Sinton
ATTORNEYS.

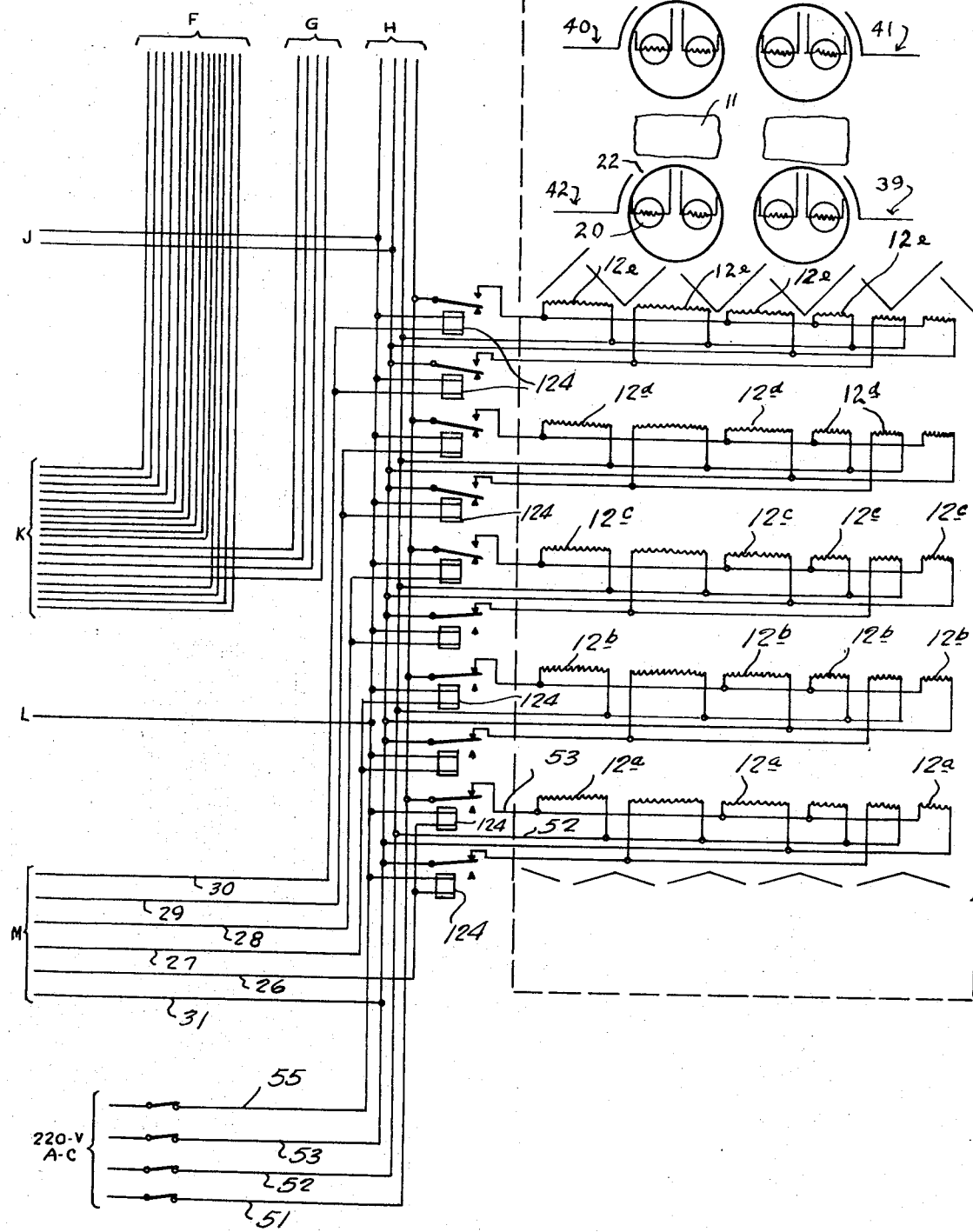

Sept. 22, 1970  A. C. ROBINSON  3,529,358
PROCEDURE FOR HEAT TREATMENT OF MATERIALS
Filed June 19, 1969  10 Sheets-Sheet 8
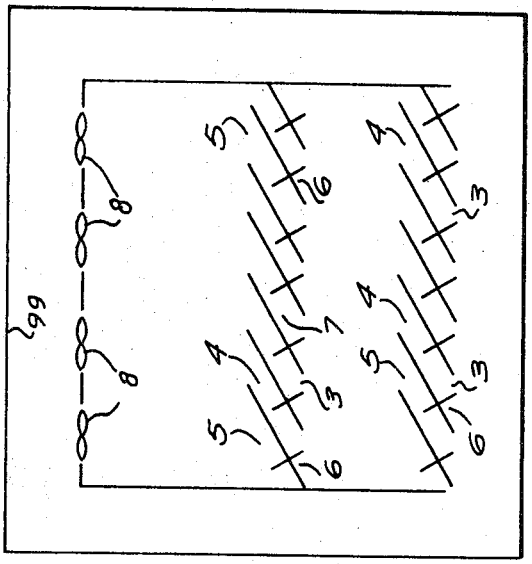
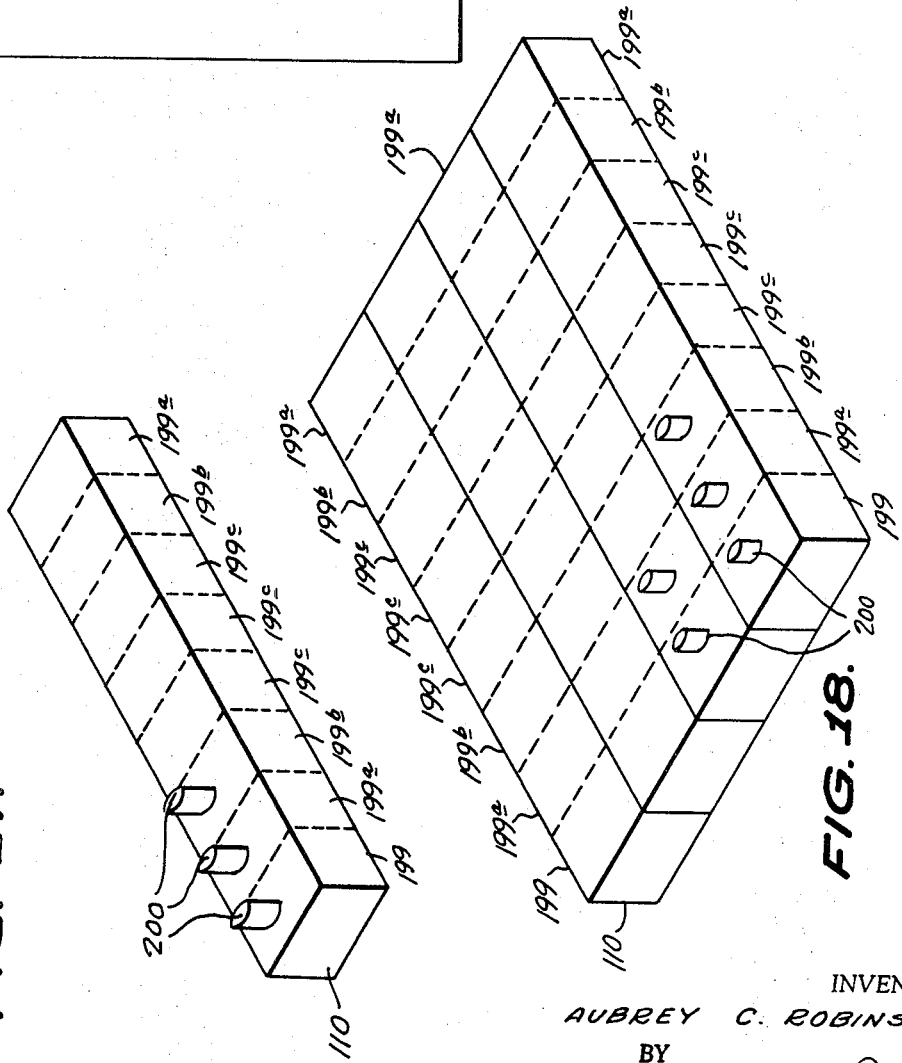
INVENTOR.
AUBREY C. ROBINSON,
BY
ATTORNEYS.

Sept. 22, 1970            A. C. ROBINSON            3,529,358

PROCEDURE FOR HEAT TREATMENT OF MATERIALS

Filed June 19, 1969            10 Sheets-Sheet 9

INVENTOR.
AUBREY C. ROBINSON
BY
Linton and Linton
ATTORNEYS.

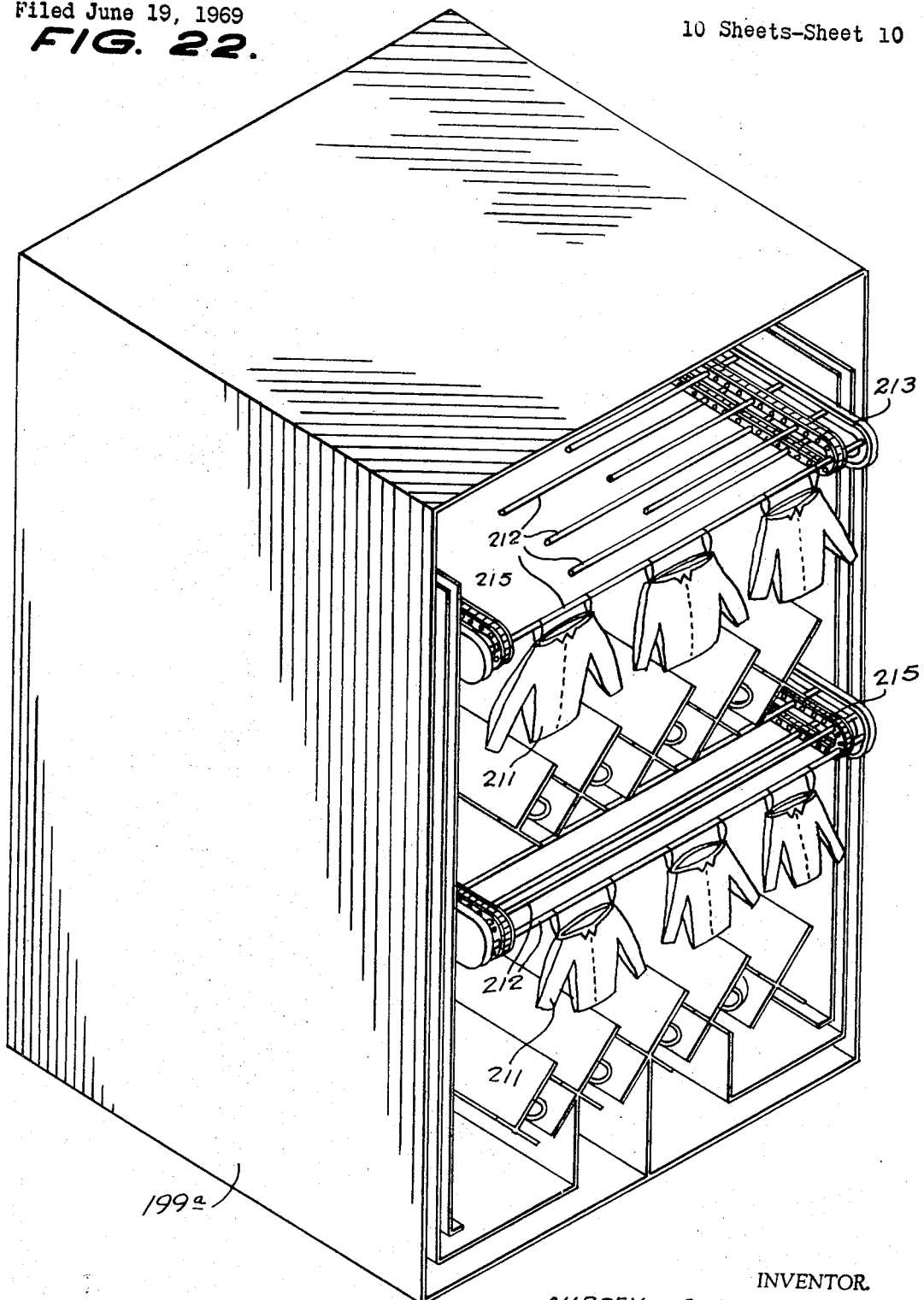

United States Patent Office 3,529,358
Patented Sept. 22, 1970

3,529,358
PROCEDURE FOR HEAT TREATMENT OF MATERIALS
Aubrey C. Robinson, La Grange, Ga., assignor to C. Terrot Sohne, Stuttgart-Bad Cannstatt, Germany, a firm
Filed June 19, 1969, Ser. No. 834,727
Int. Cl. F26b 3/24, 3/34
U.S. Cl. 34—26                    3 Claims

ABSTRACT OF THE DISCLOSURE

A process for overcoming the erroneous and inefficient heat treatment of materials such as in the deferred curing of textile garments and pieces of goods, metal, wooden, lacquered surfaces, ceramics, and other objects or materials, where it is known that the product head of materials undergoing heat treatment should be brought up to the last level equal to that of the environmental temperature level which is used to impose the head treatment upon said material without uncontrolled underheating and/or overheating said material in the process, and where the application of such product head should be made in a gradual manner in order to hold peak heat levels to the minimum level required for given results.

---

The present invention relates to an electric heating oven system for the heat treatment of various objects, but more particularly, for the cooking of meat and other food products by passing currents of air thereover.

The present application is a division from my co-pending application Ser. No. 488,886, filed Sept. 21, 1965, now Pat. No. 3,467,815.

It is an object of my invention to provide an electric heating oven system which can be precisely controlled to apply uniformly required heat volume at desired temperature levels simultaneously to a number of objects to be cooked, such as, large roasts or other objects.

Another object of my invention is to provide an electric oven in which heat is applied to the material to be heated or cooked in heated streams of air or vapor and not by direct radiation from heating elements.

Still another object of my invention is to provide shielding jackets to enclose the heating elements through which a current of air circulates while preventing direct radiation of heat from the heating elements onto the objects to be heat treated.

A further object of my invention is to provide elimination of all storage heat usually functioning in ovens as heat sink and used to reduce temperature by relating mass of metal volume to volume of heat generated, to receive heat when the oven is overheating, and to re-release heat to the oven when the oven is underheating, thus, providing a thermal delay action in the heat environment in which temperature sensing devices are placed.

A further object of my invention is to provide by the absence of any thermal delay characteristics inside the oven, itself, a sensing environment which is instantly responsive to generation of out-going heat, and, conversely, to which variable regulation for heat generation is also instantly responsive to sensing devices.

A further object of my invention is to provide a method for temperature sensing response controlling switching "on" and/or "off" heating coils of varying heat generating capacities, and as located together in each heat generating assembly, to operate singly or in combination with each other so that heat volume may be varied up or down in a continuous heat generating process, without the use of expensive variable transformers or saturables and the elaborate control mechanisms required therefor.

A further object of my invention is to provide a method for a compound temperature sensing response operation of varying both the volume of circulating air and the volume of heat generation in relation to each other to regulate the volume of heat required to maintain a stabilized cooking or heating process at desired temperature levels, as preset for the high and low temperature points, namely, the beginning temperature and the ending temperature of the air in its passage around and by the cooking objects where heat volume generated will be precisely that which is absorbed by the meat.

A further, and very important object of my invention is to provide a safe method for low heat cooking where the ending temperature of the air passage over the meat can be reduced to the lowest point possible to still prevent the multiplication of various bacterial cultures involved in meat or food spoilage.

A further object of my invention is to eliminate the necessity for turning meat while in the cooking process for purposes of preventing over-cooking at various portions, or for crusting control, by reversing the flow of air circulation at desired point or points in the cooking process.

Still another very important objective of this invention is to make applicable to textile goods, as well as to meat and other foods, a heat treatment resulting from even generation and dispersal of heat, with the compound sensing system controlling both air flow and heat generation, to protect delicate cotton fibers, as blended with synthetics, from the ravages of both unintentional overheating, and from peak heat intensities fixed higher than necessary to protect against unintentional underheating.

Another objective, in connection with the objective just outlined, is to provide an arrangement of plural separate, and independently operating, units of heat treatment, in series, one unit with another, to accommodate a tempering heat treatment procedure whereby the heat intensity imposed on textile goods can be imposed in stages of intensity levels for each succeeding until until peak heat intensity for curing is reached, and after the curing exposure, where the heat intensity necessary for curing as applied in the textile goods can conversely, be withdrawn therefrom in stages with a brief time interval in each unit to permit some seasoning of the cure as respective lower heat intensities are reached successively as down to ambient temperature.

Still another objective of this invention, is that by removing economic hazards formerly met from under-heating of the textiles in conventional ovens, to reduce the need for peak heat intensity levels presently used, so that lower peak heat intensity levels can be used which can result in lowering the proportion of synthetic materials and bonding additives in the blend mix with cotton materials necessary for permanent shape memory in wash-and-wear goods.

Still another objective of this invention is to widen the scope of materials and products which may undergo heat treatment in this manner, to include products of metals, ceramics, wood, chemical compounds, lacquers, etc.

My invention will be understood from the following specification and the accompanying drawings in which:

FIG. 1 shows, on the right side, a cross sectional view of the arrangement of the fixed controls as positioned in the interior of an oven space, and, at the left side a blown-up view of the panel on which the variable controls are mounted, with box configurations of these individual control units, or specialty electrical components, as placed, each one, adjacent to the component it controls, and, also, line configurations for each set of sensing elements, two thermistors in each set with circuit wires therefrom, as control lines to sensing locations so indicated back to control boxes on control panel.

FIG. 2 shows the external perspective view of the oven casing of the oven in which fixed controls are located, with the control panel and fan motor attached thereto.

FIG. 4 shows a pair of heating elements on a mounting base and their connecting wires.

FIG. 5 is a view taken on line 5—5 of FIG. 3 and shows the structure of heating jackets with heating elements mounted inside, and a thermistor temperature sensing element mounted nearby.

FIG. 6 is a view taken on line 6—6 of FIG. 2, showing a plurality of roasts mounted on a plurality of shafts disposed transversely of the oven casing, and a fan to direct currents of air thereon.

FIG. 8 shows details of a temperature sensing response control switching system which is represented as a box in FIG. 1.

FIG. 9 shows a side view of details of the mounting of one heating element.

FIG. 10 shows the details of the program switch, which is represented as a box in FIG. 1.

FIG. 11 shows details of vertical section showing baffle metal adaptors to direct air horizontally from one heating jacket to the next, and arranged as shelves on which to place roasts or cuts of meat, in containers containing liquids, or pans of baking materials.

FIG. 12 shows a view taken on line 12—12 of FIG. 11 and shows a plan view of the metal baffe and heating jacket adjacent thereto.

FIG. 13 shows a perspective view of the fan traverse cut-out of the fan plate separating the cooking compartment from air head above the fan, and air channels opening therein.

FIG. 14 shows details of linear resistance variable regulator in series with power feed to fan motor, and represented as a box in FIG. 1.

FIG. 15 shows elements of variable heat generation output of heating elements located in one location in one heating jacket, and electromagnetic power switches therefor, which electromagnetic power switches are represented as a box in FIG. 1.

Figure 1:
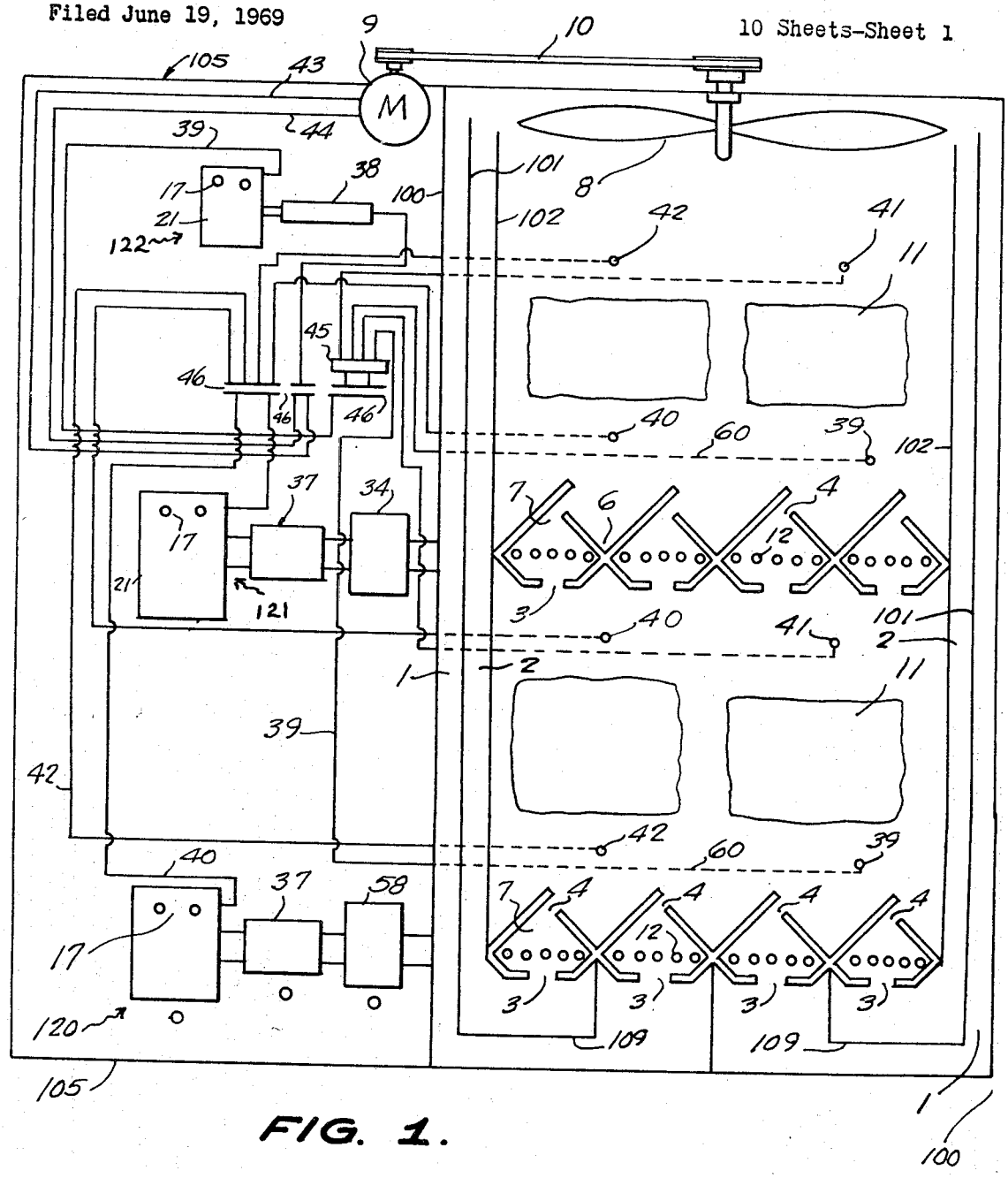
FIG. 1a shows a top plan view of the oven assembly.

FIG. 16 shows, at the bottom, the elements of variable heat generation shown in FIG. 15 extended to plural locations in respective heating jackets from one group of circuits, with the power load of each circuit of heaters divided equally by each phase of a three phase circuit, and electromagnetic power switches therefor, which electromagnetic power switches are represented as a box in FIG. 1. And further shows at the top thermistor elements in the control lines positioned in one lower cooking compartment as shown in FIG. 1.

FIG. 17 is a perspective view of heating units assembled together in series.

FIG. 18 is a perspective view of an array of plural assemblies of the units of FIG. 17 arranged longitudinally and transversely in rows.

FIG. 19 is a view in cross-section showing the interior space arrangement providing the air return channels on the edges.

Figure 20:
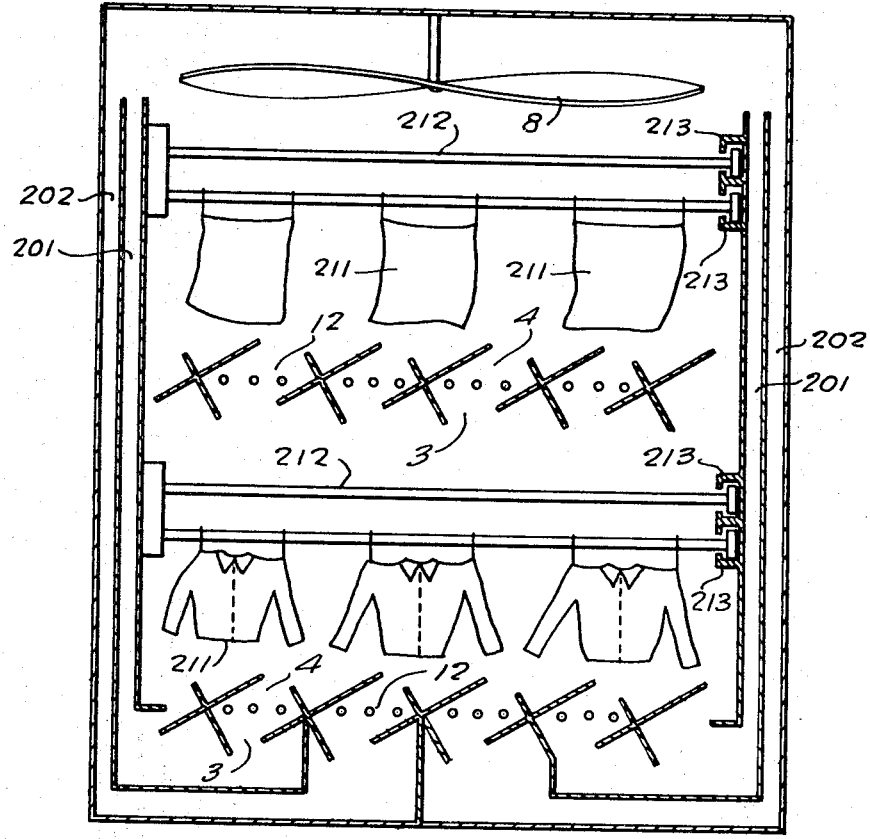

FIG. 20 is a view in cross-section on one cell of FIG. 17.

Figure 21:
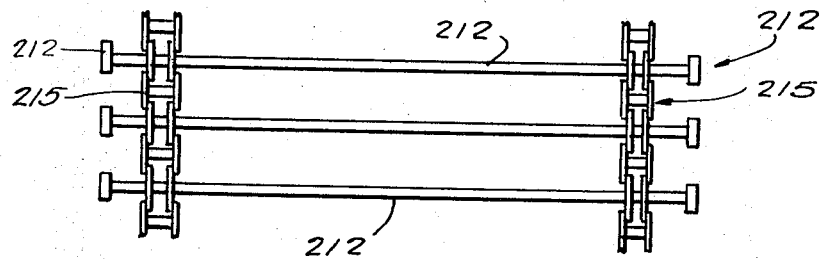

FIG. 21 is a top view of one of the cells of FIG. 17 showing the section of the conveying means for the objects to be heated, and FIG. 22 is a top view of one of the cells of FIG. 17 showing the conveyor system.

Referring to the drawings in detail, in FIG. 1, 1 is a channel within the inner wall of oven 100 and partition 101 of the oven through which a current of air generated by fan 8 passes downward to an aperture 3 through which the current of air passes upward through jacket enclosure 7 around heating coils 12 and out through an aperture, or, vent 4, and on upward through the oven, as, simultaneously a similar current of air also generated by fan 8 passes downward through channel 2 within partition 101 and partition 102 to a similar air aperture 3 and upward a similar jacket 7 around heating coils 12 and out through similar aperture or vent 4 and upward through the oven, intermixing as necessary the current of air emitted upward from channel 1. Intermixed or composite air current 1 from the aforementioned channels and companion outer and inner channels 1 and 2 at the right side of the oven continue upward, and around cuts of meat 11; to another set of heating jackets 12 at an upper horizontal level in the oven, whereupon the composite current of air pushes in through four respective apertures 3 of the four heating jackets 7 and around heating coils 12 in second level jackets and around cuts of meat 11 positioned in the upper level compartment of the oven and finally returns to fan 8, or bounces to fan 8 by plate 103, shown also in FIG. 13, and thus to repeat circulation cycle over and over again. Channels 1 and 2 are equal volume channels, and heating jackets 7 formed by two adjacent insulated wing throughs 6 each with an insulated wing heel shield 5, are mounted in both lower and upper levels of mounting in such a manner as to form equal distributive volume units for intake and dispersal of air in relation to horizontal void of the oven, and in relation to symmetrically placed cuts of meat 11; fan 8, as it revolves, traverses a circle for the entire horizontal span of the oven void, and together with plate 103, completes an air circulatory system whereby air is dispersed in uniform volume as related to the inner space of the oven and its cooking contents.

Referring now to parts of the drawings which relate to the heating system, in function sequences, plural electric heating coils 12 with schematized variance in wattage capacity 12a, 12b, 12c, 12d, 12e (FIG. 15) are used together in respective locations or jackets, and mounted as shown in FIGS. 1, 4, 5, 3, 7, 9, 11, 15 and 16 etc., and are energized directly from 220–226 volt "power-in" A.C. lines shown in detail in FIG. 16. Power switching is controlled by respective electromagnetic switches 124, FIG. 15, which are actuated by temperature sensing response mechanisms and systems which are referred to separately, as follows:

FIG. 8 shows the mechanisms or electrical components used together as a method for producing motor rotation action as controlled by temperature sensing responses, which are: two identical double pole electromagnetic switches, 18, where one pole of each switch is in reverse contact position from that of the other pole of the same switch, namely, one pole open when switch is de-energized, and closed when switch 18 is energized, and open when switch 18 is de-energized. There are two jumpers 19, one each connecting like poles of the two switches 18 together; two identical transistorized Wheatstone bridge type controllers 16, such as Fenwall commercial type of equivalent, and each controller with its individua sensing circuit to a thermistor sensing element, 20, and each controller, 16, with its individual variable resistor, 17, of potentiometer, which is calibrated in temperature setting. Each controller is powered from 110 volt A.C. leads 14+15 and actuates a separate one of the two double pole electromagnetic switches, 18. One lead coming also from tap off lead 14 of volt A.C. power circuit has a T connection to both movable contacts of one electromagnetic double pole switch; and the two lugs, or stationary contacts, of like poles of each electromagnetic switch are connected directly to power lead 14 has off-feed leads 24– where the second electromagnetic switch 18, not connected directly to power lead 14 has off-feed leads 24–25 to operate as follows; movable contactor of switch 18 which is closed when its switch is de-energized is connected by power lead 25 to reversible motor 23 at a coil position to complete power circuit to motor 23 so that the motor rotates in clockwise direction; movable contactor of the same lower electromagnetic switch 18 closed when its switch 18 is energized, is connected by lead 24 of the same motor 23 to complete the power circuit at a coil position so that the motor rotates in a counter-clockwise direction. With mechanism so arranged as described above, a method for the operation of a temperature sensing response is evolved as follows: The variable resistors 17 of the two controllers 16 are set close but not quite together, down to within 3 degrees F. apart: the sensing elements 20 of both controllers 16 are placed in the same temperature environment; each of the two controllers 16 has a two degree differential between "make" energized, and "break" de-energized; if and when the temperature is at or below or falls to 1 degree F. below the present temperature of lower set controller 16, that controller energizes its electromagnetic switch and lead 21 to motor 23 is energized and causes motor 23 to rotate in a clockwise direction which it continues to do until the temperature rises to or above 1 degree above the preset temperature of the lower set ocntroller 16, whereupon the controller 16 then "breaks" or de-energizes and opens switch to the lead 24 and the motor stops; if and when the temperature rises to or above one degree F. higher than the higher preset temperature controller 16, that controller "breaks" and de-energizes, where with the other controller already de-energizes at a lower temperature, and the like pole there already closed. the circuit through lead 25 is closed to motor 23 which begins to rotate in counterclockwise direction which it continues to do until the temperature falls to or below 1 degree F. below the higher preset temperature controller, then reaching or falling to the temperature the controler again energizes its switch 18, whereupon the movabe contact is opened to lead 25 and motor 23 stops; thus results higher preset temperature controller controls for counter-clockwise rotation of motors 23, and the lower preset temperature controller controls the clockwise rotation of motor 23, with the impossibility for both controls to operate simultaneously, and where both of leads 24–25 are open circuit when one controller is energized and the other controller is de-energized, with the intervening temperature band between the two control points providing no motor action, and, thus, becomes the "found" band stabilization of. Controller depicted in FIG. 8 which is represented in box 21 in FIG. 1. Motor 23 as shown in FIG. 10, as previously shown in FIG. 8, may drive pinion gear 35, and, in turn, drive ring gear 34 and rotate threaded shaft 32 and move contact arm 33 to the right, or left, laterally across the switch positions of the program switch, FIG. 10, and the array of contact strips to switch "on" or "off" singly, in various combinations, contact strips, and control leads, 26, 27, 28, 29, and 30 from the current supply on bus bar 31, to actuate respective one or ones of electromagnetic power switches 124 in FIGS. 15 and 16 of the respective circuits of parallel connected coils, where each coil in a circuit, as shown in FIG. 16 is of the same wattage capacity but with a schematized variance in wattage rating of coils between that of one circuit and that of another circuit. As an example, as shown in FIGS. 15 and 16, the circuit with the lowest rating, 12a of X watts, 12b 2X watts, 12 4X watts, 12d 8X watts, and 12e 16X watts, with control leads 26, 27, 28, 29, and 30 respectively controlling electronmagnetic power switches of these circuits of heaters, and an array of contact strips from which these respective control power leads 26–30 come, are positioned in such a manner across the face of the program switch 10, that, starting with each switch position (for contact strip—arm 35) starting with the "off" position, where no contact strips are positioned, to the next right position with a strip for 12A circuit only positioned, each succeeding switch positioned to the right have contact strips positioned either singly or in combination with each other, to, by manipulating electromagnetic power switches 124 in FIGS. 15 and 16, increase wattage output switched to an array of electric heating coils in one heating location or heating jacket by X watts for each switch position step-by-step through thirty-one switch positions, from X watts up to 31X watts for the last switch position, thus to implement a method of increasing or decreasing wattage output in clusters of heaters by moving, in a temperature responsive power driven way, the contact arm 33 to the right or left, and thus increase or decrease gradually X watts at each change of switch position of contact arm 35, and without interrupting a continuous heat generation. Provision must be made in the gear ratio between motor pinion 35 and ring gear 34 for the threaded shaft to turn slowly enough to move contact arm 33 slowly enough from one switch position, or heating elements turned off to cool, and these heaters turned on to heat and sensors to register therefrom before the next switch position involved is reached.

The program switch, as shown in FIG. 10 with its movable contact arm 33 as positioned temperature responsively from action of controller as developed in FIG. 8, through control motor 23, transmits temperature response on a reaction basis to determine the output of heat generation through a system of variable heat generation, with use of electric heating elements as shown in FIG. 15 of schematized variance in wattage ratings, one element from another, as located together in one heating jacket so as to act singly, any one of them, or to act in various combinations of heating elements, as finally controlled by the program switch of FIG. 10 as represented by box 37 in FIG. 1. Details of elemental operation of the variable heat output generation is shown in FIG. 15, where the instrument of control is the remote control of respective electromagnetic switches 124 by the program switch FIG. 10, (or box 37) through contact strips as arrayed on the switch face, through control power circuit leads 26, 27, 28, 29, and 30, where any variation by X watts input can be switched in by signals or combination switching in and out of electromagnetic power switches 124 which brings about heat output variances from X watts to 31X watts, X watts at each step by individual and combination actions of heating elements 12a, 12b, 12c, 12d, and 12e.

In the lower portion of FIG. 16, an extension is made of the system of variable heat output generation as developed in FIG. 15 to plural heating jacket locations involved in one heat control entity, with circuitry arrangement for distributing power load by full powered heaters, one or more heating elements; to each phase each having three one-third power heating elements for each circuit divided one each for the three phases: power leads 51 and 52 comprise one phase, 52 and 53 another, and 51 and 53 the final phase. Control leads 26, 27, 28, 29, and 30 and all five respective sets of electromagnetic switches 124 taken together are represented as box 38 in FIG. 1. The upper portion of FIG. 16 shows thermistor sensing details 20 and 22 as developed in FIG. 8 extended to the operating location in the oven control system, but each pair of thermistors 22 are represented as control lines viz. 40, 42, for heat generation, and 39 and 41 for air flow regulation. Heating elements and these control lines are shown graphically in drawings where they are used.

Based upon characteristics of the oven and its circulatory system as shown in FIG. 1, as heretofore related point by point where it is shown that air can be circulated through and dispersed evenly within the oven enclosure, and based upon the coincidental even dispersal of heat by equal capacity of, and even generation and delivery of heat, one inch with another inch, along the length span of each of the heating jackets through which the circulating air passes, and based upon the fact, therefore, that no storage of heat can occur anywhere in the operating part of the oven since it cannot build up to any temperature level higher than that of the heated air itself with which it is in constant heat exchange and based further upon the facility for varying heat generation up and down by use of plurality circuits of heating coils, and a program switch controlling same from temperature sensing responses, as interpreted by sensing control system as shown in FIG. 8, which has also been related heretofore, and based further upon the facility for increasing or decreasing the rate of flow of air circulation through the oven as controlled by a variable resistor system as shown in FIG. 14, in series with the power feed to the fan motor propelling the fan from temperature sensing responses as interpreted also by a duplicate unit of sensing control system as shown in FIG. 8, a method can be provided for a compound temperature sensing response operation of varying both the volume of circulating air and the volume of heat generation in relation to each other, which can be employed to automatically supply the volume of heat required to maintain a stabilized cooking process of a given mass of meat (as loaded in the oven) or other cooking objects, at desired temperature levels, as preset for the high and low temperature points, namely the beginning temperature and the ending temperature of the air in its passage around and by the meat or other cooking objects. Controls for employing this method are partly provided inside the oven as shown in FIG. 1 and partly provided by auxiliary components used and controlled outside the oven as shown in control board 105 section of FIG. 1 and can be described as follows:

Three interconnected control units are shown together in group 120 namely boxes 21, 37, and 38 for control of heat generation by lower level series of heating jackets as shown. The first box 21 as shown in the block of the same number and in detail in FIG. 8 receives sensing signals from two thermistors 20 where the two of which are shown together as a block 22 in FIG. 8, but now are particularized in one suitable control line as numeral 40 to show the extension of the one pair of thermistors to desired locations as in FIG. 16 and FIG. 1 where each thermistor is cross-matched and balanced as necessary by compensators for use with an individual controller 16, where 40, an assembly of two such thermistors and their four circuit wires is placed in the lower compartment with meat between it and then heating coils in the lower section heating the air, as shown in FIG. 16 and FIG. 1 to sense the ending temperature of the air after it has passed the meat, when air moves upward in the oven; and 42 as placed in the lower compartment with the meat in that compartment between 42 and the heating coils in the upper level of heaters, heating the air when air is passed downward through the oven, to sense for ending temperature of the air after it has passed the meat in the lower compartment. One section of hand switch 46 determines the appropriate lead off of 40, to be switched to controller 21 as interlocked in same switch, as it switches in also the appropriate power lead 43 or 44 to fan motor 9 for the right direction of rotation of the fan motor to pull air upward or push it downward through the oven. The power lead 43 in FIG. 1 for fan 8 rotation to pull air upward, or power lead 44 to reverse fan rotation to push air downward, as the third lead 15 from fan motor 9 is to ground to complete the circuit. The second box 37 in control group 120 contains the program switch, shown in detail in FIG. 10 where the contact arm is moved back and forth by motor 23 in box 21 of the same group 120, to manipulate switching control current to leads 26, 27, 28, 29 and 30 as shown in FIG. 10 and also in FIGS. 15 and 16 which extend in box 38 of same group 120, which contains power-in leads to circuits of heating coils 12a, 12b, 12c, 12d, and 12e also contains electromagnetic switches 124 in FIGS. 15 and 16 actuated by control leads coming from box 37 to energize heating coils 12a, 12b, 12c, 12d, and 12e of respective circuits, and thus provide the controlled heat generation.

To describe the joint temperature sensing response control of the volume of air flow by varying the speed of the fan: Air temperature is sensed for a preset temperature level at its initial temperature after leaving the heating jackets and before striking the meat by sensing unit extension 39 of sensors in lower compartment which are associated with sensing control box 21 in group 122, where its motor 23 by pinion drive 131 FIG. 14 moves arm contactor 128 across linear resistance all contained in box 38a in group 122, and as shown in detail in FIG. 14 to lengthen or shorten resistance and vary speed of fan through lead 39 which passing to section of interlocked switch 46 to be alternately switched to lead 43 or 44 going to fan.

Using the lower cooking compartment as the space to be jointly heat controlled by both heat generation and air flow, when air flow is upward through oven group 120 of interconnected mechanisms boxes 21, 27 and 38 which are involved with the lower level heating elements, containing one coil of each of the five circuits 12a, 12b, 12c, 12d, and 12e of varying wattage capacities for coils 12a, 12b, 12c, 12d, and 12e respectively as shown in FIGS. 15 and 16 in each one of the four separate heating jackets, and sensed for heat generation (variation) by sensing circuit 40; while simultaneously and conjunctively use of group 122 of interconnected mechanisms boxes 21 and 38a which are involved in regulating the speed of fan motor 9 and fan speed and rate of flow of air from fan 8, is sensed for fan speed regulation by sensing circuit 39 gives a total situation where sensing unit 39 is controlling for the initial temperature of air before it strikes the meat, and sensing unit 40 is controlling for the ending temperature of the air after it has passed the meat, and has had heat withdrawn therefrom by the meat. The method of compound temperature sensing response control of the above described operation is as follows:

The initial temperature for the air flow before striking the meat is preset in variable resistors 17 of box 21 in group 122, and can be any temperature level desired for the resulting cooking effects, and the ending temperature of the air after it has passed the meat is preset with variable resistors 17 at box 21 of group 120, and can similarly be any temperature desired, though necessarily some little or considerable lower than the temperature level preset for the initial temperature, to provide for withdrawal of heat from the air stream by the meat, for cooking results also, such as crusting, overcooking and undercooking, etc. In this method of heat control, varying the air volume or relating mass of air to heating elements delivering heat thereto becomes, in reality, a temperature control of the air stream, while varying the amount of heat being generated becomes in reality the heat volume control. Thus, with a system of out-going heat delivery, with no heat storage in metal possible, this compound temperature sensing response operation controls the volume of heat on an absolute basis at these temperature levels which is delivered to and absorbed by the meat or other cooking goods.

The amount of heat volume which can be absorbed by any given mass of meat would, of course, vary upward or downward with the temperature levels at which the heat is delivered to the meat. With any given preset temperature levels for initial and ending temperature of the air volume, the meat will continue to cook with the controls both air volume and heat generation varying under the temperature sensing response system to produce the volume of heat being absorbed by the meat at these temperature levels so long as the meat is able to absorb enough heat from the gradually decreasing volume of both air volume and the heat generation to effect the drop in temperature levels between these two beginning and ending temperature points. When heat generation and air flow both can be observed to have dropped drastically, the controllers and power feed through the electromagnetic switches to motor 23 controlling the fan speed can be cut off, whereupon the fan speed and air volume will remain fixed at this point thereafter, and the meat cooking process can continue until the initial temperature drops gradually to approach the same temperature level as that for the ending temperature until meat is done.

Safe cooking at low heat is possible when the ending temperature at point 40 is down to the lowest temperature and heat level which will still prevent the multiplication of bacteria cultures involved in the spoilage of meat, as this is the lowest temperature level in the oven.

The compound temperature sensing operation can be maintained in either the lower cooking compartment with air flow in either direction, or in the upper compartment with air flow in either direction, but not in both simultaneously, by manipulation or switching of switch 46 sensing units and direction of fan rotation as follows:

Group 120 involved with the lower level of heating coils, and with sensor circuits 40 associated therewith, is operable for cooking in the lower compartment with sensing unit 40 operating therein when air flow is upward in the oven, and is operable for cooking in the upper compartment with sensing unit 40 operating therein when air flow is downward in oven. Group 121, which is an exact duplication of the mechanisms, interconnected, of that for 120 with sensing units 42 associated therewith, is operable for cooking in the upper compartment with the sensor circuit 42 operating therein, when air flow is upward in the oven, and is operable for cooking in the lower compartment with sensor unit 42 operating therein when air flow is downward in the oven.

Group 122 with interconnected mechanisms in boxes 21 and 31a in FIG. 1, with sensor circuits 39 (and 41 associated therewith) will control the volume of air flow in accordance with the temperature setting preset therefor, and as sensed at any one of the two sensing units 39 or as sensed at any one of the two sensing units 41. 39 is designated for use when air flow is to be upward, and 41 is similarly designated for use when air flow is to be downward.

The direction of flow of heat upward can be reversed to downward flow with sensors interchanged for proper cooking operation by manipulations as follows: As air flow can be sensed at one point only, all eight thermistor sensing units associated with box 21 in group 122 lead in to hand switch 45, and as separate units, namely 39 and 41 as placed in the upper cooking compartment, and 39 and 41 as placed in the lower cooking compartment. Use of two position switches 45, interlocked will switch in 39 and 41 respectively of upper cooking compartment when thrown to one position, will switch in 39 and 41 respectively of the lower compartment when thrown to the other switch position, to select whichever one of the two cooking compartments is to be used for joint control for heat generation, and extends such circuit connections to hand switch 46, interlocked not only for the air flow sensor units but for upper and lower level heating coils, and circuitry for controlling the direction of fan rotation, and air flow, also is a two position switch 45 which when thrown to one position interchanges all sensor connections and fan motor rotation circuit in such a manner that only one sensing unit of air flow as proper for joint sensing operation for that air flow is switched in for the control cooking compartment as previously selected by switch 45 and proper sensing unit for heating coils upper or lower for proper air flow (upward or downward) for both cooking compartments, and thermistors in the fan motor lead also for proper fan rotation and air flow, all by upward flow for one switch position of 46 and downward air flow for the other switch position of 46.

With joint sensing operation for air flow and heat generation switched to either one of the two cooking compartments, it cannot, of course, operate for the other one of the two compartments. On the other hand, air flow as it is control jointly with heat generation in one compartment is fixed for its flow through the other compartment. Heating coils operating for the other compartment with proper sensing unit at proper sensing point can react to the fixed air flow and volume, and control for the ending temperature is preset after passage around meat in this other compartment. And while not participating directly in the compound sensing operation, it can cooperate in a sensing operation: where this other cooking compartment is, merely, as it is designed to be, an annex of the other compartment containing meat which compares in bulk or mass and content condition with meat in the controlling compartment, when the heat absorption capability of the meat in the non-controlling compartment will be approximately the same as that for the controlling compartment, and the beginning or initial temperature level for the air before striking the meat in non-controlling compartment, will be approximately the same as for the controlling compartment, but, however, the meat mass is larger in the non-controlling compartment, more heat will be required to maintain common ending temperature, hence the initial temperature in that non-controlling compartment will be higher than that for controlling compartment, or if meat mass is less and heat absorption is less for non-controlling compartment, then the initial temperature of the air flow in this compartment will consequently be less than initial temperature of air flow in controlling compartment.

Referring now to the drawings showing fabrication and structural aspects of the oven:

FIG. 2 shows at 99 the exterior metal casing of the boxed-in oven having a door 110 opening out from one side thereof, and containing a glass window 111 and having mounted at one side a control board 105 containing control components as shown in detail in FIG. 1.

Figure 7:
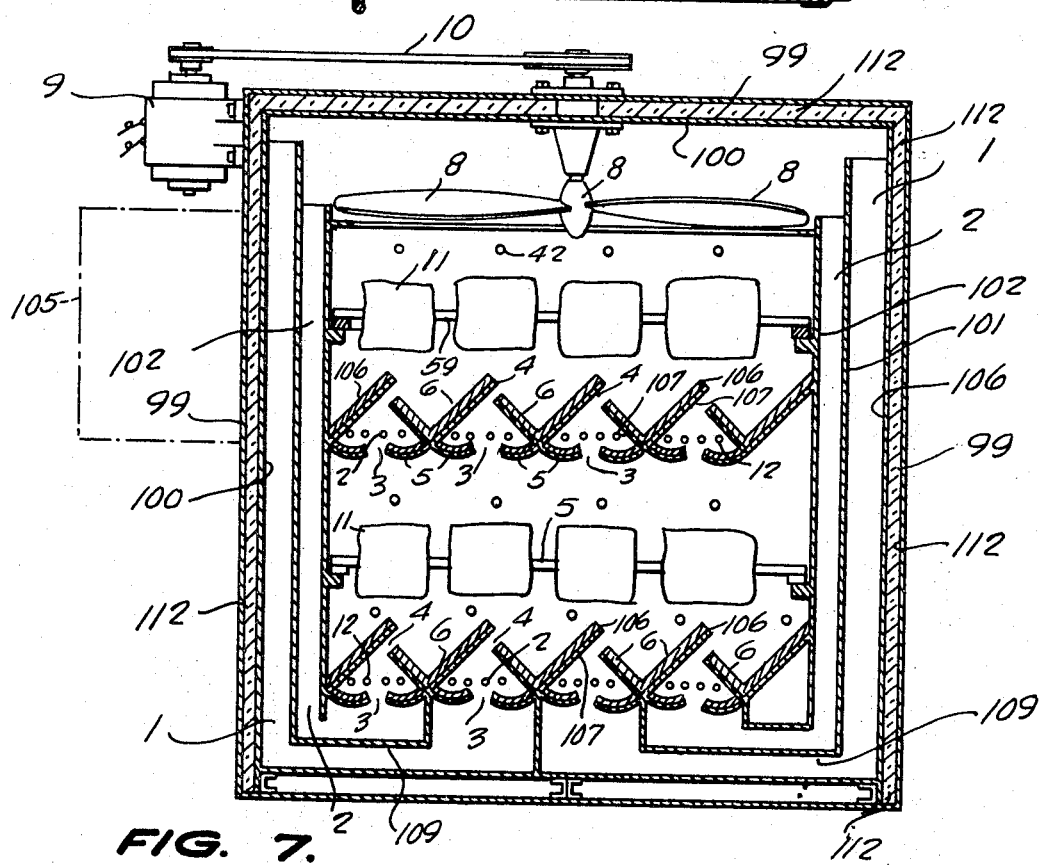
FIG. 7 shows a view taken on line 7—7 of FIG. 2, and shows a cross-sectional view of the oven casing including a plurality of shafts on which roasts are mounted, and a plurality of heating elements mounted in shielding jackets, and air conduits through which currents of air are directed by the fan.

As shown in FIG. 7, flexible heat insulating material 112 is laminated between outside metal casing 99 and inner metal surface 100. Partitions 101 and 102 are spaced apart from the inner side wall at either side, and extend horizontally from front to back, with top edges spaced apart from inner metal surface of top of the oven to provide air passageways, and similarly having lower edges spaced apart from inner metal of bottom of oven to provide air passageways, except that one edge of partition 101 extends sufficiently below the edge of partition 102 to make a right angle juncture with separator plate 109, where 109 extends and bounds air channels 1 and 2 formed between spaced apart partitions to respective ones of the bottom row of heating jackets. Partitions 101 and 102 are detachably positioned from inner back of oven.

A series of baffle plate drain troughs and heating jackets 5 and 6, each running or projecting from back to front are arranged in a row along a horizontal level, and spaced apart so that a heating jacket enclosure 7 is partially enclosed by each two.

The two inner partitions, 102 each running from front to back, at each side of cooking compartment, make each a right angle junction with fan plate 103 as shown in FIG. 13. Fan plate 103 has a cut-out for fan travel and separates the cooking compartment from the air head above the fan, and functionally prevents any back flow of air contained in this air head back down into the cooking space, adjacent baffle plates and with air passageways openings one at top 4 and one at bottom 3 of heating jacket so formed, with each unit of baffle plates so constructed as shown in front view in FIG. 5, where top wing trough 6 may catch and contain or drain grease and liquid drippings where the right side of wing extends up over and overlaps the opposite of the wing of adjacent trough, and is a metal casing having an inverted downward wing-like heel 5 extend outward in either direction to act as a shade for heating elements enclosed in 7. Interposed between outer metal trough 6 above and 5 below and inner metal surface 107 of the heating jacket is a layer of heat insulating material 106 to prevent the transfer of heat from heating elements either by through-metal conduction or radiation. Each baffle plate unit extends on cantilever from back where it is detachably positioned in the oven back. The bottom row of baffle plates opens directly into individual air channels 1 or 2 through aperture 3, and open upward into oven, where another row of baffle plates are superimposed from the back of oven along a horizontal level higher in the oven. Each heating element assembly in heating jacket 7 contains one or more electric heating coils 12 each coil with individual terminals for circuit connections mounted in suitable ceramic and metal sheathing, is mounted in a threaded manner with screw down bolts in back plates of oven and extends frontward through enclosure 7 makes a hair-pin bend and back to mounting as shown in FIGS. 4, 9, and 12.

Fan 8 is rotatably mounted in the center top of the oven in a manner to pull air upward, or downward through oven to or from air channel 1, 2 spillways, and traverse the traverse circular span of the oven in which the cooking area is of equal width and depth. Fan plate 103 as shown in FIG. 13 extending front to back along one horizontal level and making right angle juncture with inner partitions 102, has a cut-out to circumscribe and bound fan blade travel space and thus separate upper fan head space opening into air channels 1 and 2 and the main oven space.

Figure 3:
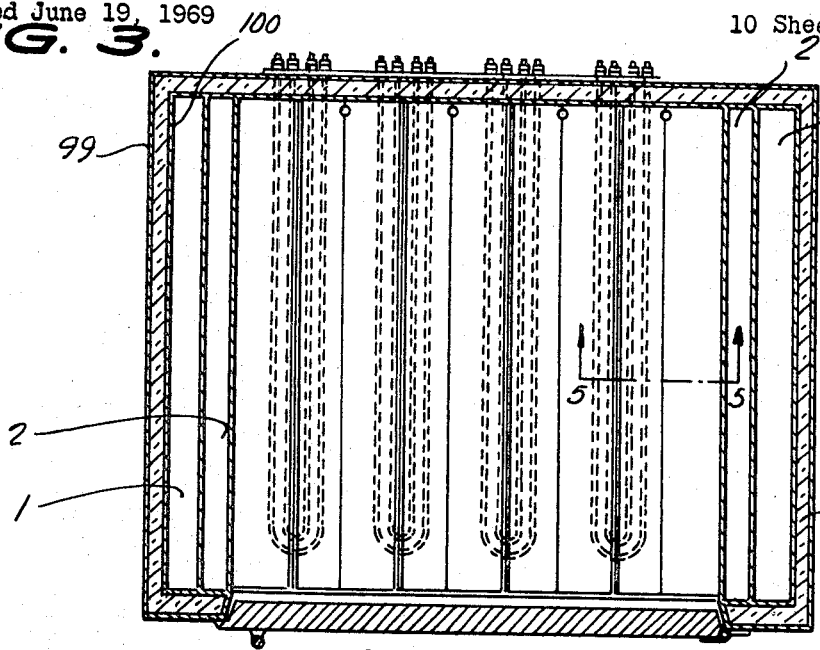
FIG. 3 is a vertical view through the oven casing taken on the line 3—3 of FIG. 2, showing heating elements mounted in positioned groups.

FIG. 3 is a vertical view of top side of the troughs and heating jackets with positioned heating elements extending thereunder as taken on line 3—3 of FIG. 2 and shows the four troughs overshading the four respective heating jackets located on one horizontal level.

FIGS. 6 and 6a show top plan view taken vertically of the inner oven space with fan motor 9 and control board 105 attached to the outside, and shows meat 11 as mounted on rods 59. These views are also taken on line 6—6 of FIG. 2. Meat may also be positioned in cooking space on insertable racks 60 as shown in FIG. 1.

FIGS. 4 and 9 show the mounting of electric heating coils. Details covering two such heating elements show the manner of mounting plural elements even though the number of such elements may be as many as 5 or more. Moreover, actual heating coils may in plural numbers be mounted within one metal sheath, viz: the three lower rated coils X, 2X, and 4X may be enclosed in one metal sheath, while coils of rating 8X and 16X may be enclosed in the second metal sheath.

A modification may be made of this oven and heat control system using the intervalized positions for heat generation, or heating jackets, in the manner described to heat-treat cooking, or for the heat treatment of goods with horizontal charges of heated air, controlled in the same manner as for vertical travel of air. Such a modification consisting of metal baffle adapters running from front to back in cooking or heating space and across, sideways to make a junction with a heating jacket in which plural heating elements, controlled in same manner as shown in FIG. 1, may be effected in the same oven enclosure as shown in FIGS. 1 and 7 by provisions for mounting baffle heating jackets and heating coils.

The essentials of such a heating system employing side to side delivery of heated air are shown separately in FIG. 11. Two partitions 117 separate cooking space from oven inner metal 118 and form two air channels 119 running from front to back, and running vertically to form the two sides of the cooking space. Metal baffles, adapters 113, run front to back horizontally and likewise across each respective level, taken to make a T or right angle junction, with insulated heating jacket 116.

Heating jacket 116 consists of two spaced apart insulated sides, running horizontally from front to back of the oven enclosure. The corner side 115 with insulating material between inner metal surface 116 and the outer metal surface which makes a corner junction with the side of partition 117, and the next succeeding upward metal baffle 113, while the inner section of the insulated side of heating jacket 114 with its inner metal surface 116 spaced apart from that of the side 115 to form heating jacket 116 in which heating elements 125 are positioned from back to front of the oven, and through which such formed heating jacket moving air is passed around said heating elements 12, from one level formed by metal baffle 113 and the next lower, or higher such metal baffle 113 below or above it, where the air pulls around between two adjacent metal baffles 113 and their respective adjoining heating jackets 116 positioned at alternate sides of the cooking space from one cooking level to another as pulled upwardly or pushed downwardly by fan 132 to make one circulatory cycle after another and as regulated by temperature responsive fan motor speed control by same system as shown for boxes 21 and 38a in FIG. 1, group 122, where heat generation is varied up and down with plural circuits of plural heating elements 12 located one element 12 of each circuit in each heating jacket, by same combination of boxes 21, 37, 38 in groups 120 and 121. Motor means is provided to drive fan 132.

The control mechanics of cooking, or heat treating with these particular controls are as follows: An array of uniform heating elements as shown in FIG. 16, are positioned to protrude from back to front in each heating jacket shown in FIG. 11, where each jacket is formed by the inner metal surface 116 of insulated bolster 114 joining in the end of metal baffle 113, and the inner surface 116 of adjacent insulated bolster 115 jammed as molding against the side or partition 117 and the next upward succeeding metal baffle 113, as the heating jacket so formed making a 90 degree circle bend from lower vertical opening or aperture 123, to exhaust, when air in upward flow, in a horizontal direction through upper opening or aperture 124, where each such heating jacket runs front to back of the oven structure making a right angle junction with back of the oven. These heating elements of schematized wattage rating variance as shown in FIGS. 15 and 16, with variable heat generation effected by respective electromagnetic power switches 124, as manipulated by the program switch as shown in FIG. 10, in response to two temperature point sensing as developed in FIG. 8, with sensing heads A and B as shown in both FIG. 11 and also in FIG. 12.

FIG. 12 is a top view of the metal baffle 113 and adjacent heating jacket 116 taken on the line 12—12 of FIG. 11. When air is passing in the updraft direction through the oven structure, air is leaving the lower cooking level to be heated according to sensing controls, one set for regulating the flow of air (fan speed), as located at A in both FIGS. 11 and 12, for initial or maximum temperature, and the other sensor located at B, set to control the regulation of heat generation at the ending, or minimum temperature, as the heated air passes across the top of the meat, baking goods or other heat treatment goods such as metal or textile strips to proceed upward through the next aperture 123 and heating jacket and out horizontally in the opposite direction in the cooking level above. In the case of meat or baking goods held in pans as positioned on metal baffle 112, they receive heat by through metal conduction from said metal baffle 113 which is in heat exchange relation with air passing through the cooking level just below, as has been similarly heated in next previous heating jacket 116. Dotted lines 61 in FIG. 12 outline the space occupied by baker pans. If air is down draft, then B becomes the control point for air flow, and A the point for control of heat generation. All heating coils in each respective circuit are of the same wattage rating and located one element in each heating jacket, and as connected parallel can be controlled by one respective electromagnetic switch 124, for each of five circuits.

This oven control system, including its provision for even heat generation and dispersal, and the compound sensing system, controlling both the volume of heat generated, and the volume of air flow to which the heat is transferred as a heat changing medium, may be utilized to provide even heat delivery, and to insure against both overheating and underheating in post-curing or deferred curing of textile garments or piece goods containing synthetics and impregnated crosslinking additives such as resin, sulfone chemicals or other finish additives, wherein said textile goods, properly positioned in the heating space, instead of meat, or other food goods, as hereto described are exposed to heat treatment.

An embodiment of the essentials for such operation, and including special structural arrangements intended to overcome some of the shortcomings presently experienced Such an assembly of individually operating units 199 in FIG. 17 each of which is an entity, as shown in FIG. 2, are placed contiguously in series with one another, front to back, and with each back wall 99, as shown in FIG. 6, and with each door 110, as shown in FIG. 2, as intervening between any two of the units 199 removed, so that one unit 199 opens directly into the next unit 199, and where the completed configuration, as shown within the solid lines in FIG. 17, consists of plural cells or cubical spaces 199, as indicated by dotted lines as subdivided cubical spaces, where each such cell or cubical space contains a complete heat generation and control assembly as illustrated in FIG. 1 and FIG. 6; or where, as an alternative, each cell or cubical space may contain a heat generation and control assembly as shown in FIG. 11 and FIG. 12, but where either one of these heat generation and control assemblies is operationally augmented with control devices as illustrated in FIG. 8, FIG. 10, FIG. 14, and FIG. 16, so that the system will operate individually within each said cell.

Such an assembly of individually operating units 199 may have textile goods batch loaded therein for exposure of textile goods to heat treatment at a uniform temperature level in all cells, but where, however, the temperature level may be progressively raised and then lowered during predetermined stages of the curing process.

An alternate method may be employed to accommodate the progressive movement of textile goods, properly pre-positioned, successively to and through each respective cell by means of a moving conveyor system 212 as shown in FIG. 20, where each respective succeeding cell, or cubical space may employ a progressively higher or lower temperature level for heat treatment, viz: 199a, at temperature $t$ plus $y$; 199b, at $t$ plus $2y$; 199c, at $t$ plus $3y$; and 199, at $t$, where $t$ represents the ambient room temperature and $y$ represents a fixed temperature value as expressed in a given number of degrees Fahrenheit, i.e.: 50 degrees F.; 75 degrees F.; 25 degrees F.; 40 degrees F. etc., 100 degrees F. etc.

This progressive application of heat intensity to textile goods, amounting to a tempering process, results in a more gentle or softer application of heat treatment to effect a bonding of cellulose molecules by resin or sulfone or other chemicals into a permanent shape at lower maximum temperature peaks than those usually used at present, the lowest of which appears to be 320 degrees F. for 8 minutes exposure. This lowered temperature peak results in less deterioration to cotton fiber by heat, and consequently results in a lowered requirement, percentage-wise of synthetic fibers in the fabric blend, as imposed especially to reinforce for the resulting damage to cotton fibers from higher heat; and higher heat peaks results, additionally in a requirement for a less amount of resin, sulfone, or other chemicals, imposed especially to bond the cellulose fibers of both cotton and other synthetic fibers. A 50% reduction in tensile strength damage to cotton fibers from heat is commonly accepted under present curing procedures. This tempering method should permit complete curing or bonding at a peak temperature as low as 250 degrees F., and perhaps down to as low as 225 degrees F. The lower damage to cotton fibers will improve the shape memory of the garment, as well as the wearing quality of the finished product, and should result in a lower amount of shrinkage than now accepted under present methods of curing.

In operation, if heat treatment using the progressive change in temperature levels, cell by cell, where basic materials cellulose and resin or other chemical ingredients, results in an energy exchange as the molecular bonding occurs under heat treatment to an extent that some heat input is still required in each cell 199, where its temperature level is lower than that of the next preceding cell, for this bonding to occur, there is no problem in using normal heat and air controls in the cell with a lowered temperature level. However, the use of the tempering process, and is resulting lowered peak temperature level the goods have undergone, is intended to lower the amount of energy exchange involved in the bonding process, and thus to lower the degree of deterioration or disintegration of both fabric and dyes.

Thus, achieving the desired end of minimizing the energy exchange, the heat treatment tends, more and more, toward a heat exchange between the textile goods and the heated air swaching them, whereby the textile goods thereby serves more and more as a heat sink for the temporary storage of heat. It may become necessary, therefore, to simultaneously partially or fully exhaust heated air at the top of the cell, and to partially or fully intake the cooler air at room temperature. Thus, such a partial or full exhaust of heated air is made through exhaust port 200 in FIG. 17, while at the same time, partial to full intake of cooler air properly to all textile goods involved in the for the exhaust which may be located at the bottom of the cell (not shown) or through smaller intake port distributed at intervals within the cell, thus, to disperse the cooler air properly to all textile goods involved in the cooling-down process. This valve control operation for such parts is temperature responsively actuated by movements of the contact arm as illustrated in FIG. 14, or as illustrated in FIG. 10 and as the fan speed is also simultaneously controlled therewith.

Plural units 199, or cells, may be contiguously arranged side by side, as well as front to back in rows as illustrated in FIG. 18, where solid lines outline the completed configuration, and dotted lines indicate subdivided spaces therein, and as shown cross-sectionally in FIG. 20 and in perspective detail in FIG. 22. Such an arrangement of cells, with each section of subdivided spaces side by side having its own individual heat generation and control system, a front view of which is shown in FIG. 19, and as it may be imposed within existing oven shells already in place in using establishments to effect the necessary conversion for heat treatment of textile goods in accordance with the conditions outlined, and procedures prescribed, in the foregoing.

In the operation of the compound sensing control of both heat generation and air flow in the step by step heat treatment of textile goods, particularly in using the tempering method, it would be well to set the temperature level for the ending temperature (minimum) ten degrees F. below that set for the initial (maximum) temperature needed in each cell. The tempering process as applied to present blends and additives presently used in deferred curing of stretch denim, would be as follows:

Use seven cells 199 as described above, where the movement of good 211, as suspended on hangers from the cross bar of the moving conveyor 212 as shown in FIG. 20, through each cell 199, will require the same amount of time; use 95 degrees F. as the value of $y$, and, starting with the ambient room temperature of 75 degrees F., the stepped-up temperature in the first cell 199a where the textile goods 211 are first exposed to heat treatment, will therefore be at 170 degrees F.; the next cell 199b will, therefore, be 265 degrees F.; and the next three cells 199c will have a constant temperature of 360 degrees F.; and the next cell 199b will have a dropped-down temperature of 265 degrees F.; and the next, 199a down to 170 degrees; and the final cell, 199, at room temperature of 75 degrees F. Travel time is fixed at 2 minutes through each cell. Here textile goods have an overall heat-treatment exposure at 170 degrees, or above, of 14 minutes; and 10 minutes at 265 degrees F. or above, and at peak temperature of 360 degrees for a total of six minutes.

An alternate procedure which should result in less deterioration for some other types of textile goods using a different blend, with less synthetics and resins of bonding chemicals, can be as follows:

Use 75 degrees F. as the value of $y$, where the first cell, 199a will be at 150 degrees F.; and the next cell 199b will be at 225 degrees F.; and the next three cells, 199c will have a constant temperature of 300 degrees F.; and the following cell 199b will have a dropped down temperature of 225 degrees F.; and the next cell down to 150 degrees F., and the final cell at room temperature of 75 degrees F. Travel time is fixed at 2 minute through each cell. Here textile goods will have an overall heat treatment exposure of 14 minutes at 150 degrees F. or above; and 10 minutes at 225 degrees F. or above, and at a peak temperature of 300 degrees F. for six minutes.

As initiative in revision of blend formulas follows full confidence in and acceptance of the fact that there will be no underheating and/or overheating in the tempering method below or above the range from initial and ending temperature of air passing around the textile goods to transfer heat thereto, blending mixtures and bond additives should be lowered to make full use of the tempering heat exposure in seeking longer wearing life and better shape memory of textile garments, and a suitable procedure doubtless will be as follows:

Using 58 degrees as the value of $y$, and starting with an ambient room temperature of 75 degrees F., the first stepped-up temperature in cell 199a will be at 133 degrees F.; and the next cell 199b will be at 191 degrees F.; and the next three cells 199c will have a constant temperature of 249, or 250, degrees F.; and the first dropped down temperature in the cell 199b will be again at 191 degrees F.; and the next cell 199a down to 133 degrees F.; and the final cool-off cell 199 at room temperature of 75 degrees. Travel time is three minutes in each cell. Overall heat treatment at 133 degrees or above 21 minutes at 191 degrees 12 minutes and at peak temperature of 250 degrees 9 minutes.

A satisfactory conveyor system may be as partly shown in FIGS. 20 and 21, where the conveyor consists of a plurality of cross bars 212 which extend laterally across the heating space, and which are linked together with the sprocket link chain 214 at each side, and where the sprocket link chain also passes over two driving sprockets actuated by aiding driving motor impelling movement of the conveyor rods or bars through the cells, also not shown. Each cross bar has a freely turning roller at either end, and fashioned to be partly encased in supporting rack 213 as affixed on the side wall of each side of the heating space in successive heating cells. The bars pulled by link chain 214 with racks of textile goods 211 suspended therefrom as shown in FIG. 20 pass into and move through each cell, a front cross-sectional view of which is shown in FIG. 20 where textile goods 211 move backward through successive cells as the bar (one of the plural bars) moves along the lower rack rail 212 on each side of the heating space to support textile goods 211 in a prefixed position, as heated air passing around heaters 12 receives heat at the fixed temperature levels and air flow speed necessary to maintain these temperature levels and impart heat to moving textile goods 211 at these prefixed temperature levels. Conveyor bars 212 with textile goods removed therefrom return in lapped-over manner in rails 213 in FIG. 21, as shown in FIG. 22 to complete the convey cycle over again.

In any one of the three procedures outlined above, the result is a lower heat exchange impact by the textile goods initially, where each step, in the step-by-step procedure in the heat intensity build-up serves as a preheating stage for the next succeeding cell, and as a pre-cooling stage in the cooling-down cells; and this results in a requirement for a lowered rate of air flow in all cells, and in a more constant heat absorption rate, in B.t.u.'s per minute by the textile goods during the entire curing process.

More specifically, in the step-by-step build-up of heat intensity, cell by cell, the textile goods are preconditioned, heat absorption-wise, in each cell for the receipt of additional heat intensity to be imposed in the next coming cell, in cell by cell stages, from ambient temperature on up toward the lowest heat intensity necessary to induce the bonding process of the fibers in the fabric of the garments. And, here, heat intensity is determined by both the temperature level and the depth of the intensity as measured by the volume or flow of air involved in heat delivery. After undergoing heat treatment at constant heat intensity for the minimum time interval required for bonding, as the garments proceed through the step by step cooling down stages, the brief interval of time in each stage permits some seasoning of the bonded fibers at progressively lower temperature, stage by stage, than that having been reached for bonding, on down to room temperature.

In such a process, this oven system can insure correct adherence to prescribed procedures by textile goods in quantity; the provision for even heat generation and dispersal by and through evenly dispersed flow of air for delivery to goods of primary heat permits no shading or starved or depleted heat depth delivery to goods to result in underheating, except as provided for in differential sensing and permits no uncontrolled delivery of wild heat from uncontrolled sources to result in overheating; and the compound sensing for control of both volume of heat generation and the flow or volume of air medium to which the heat is related, senses and proportions the exact amount of heat intensity required in each cell, with the heat control in each cell completely independent from that in any one of the other cells. This provides flexibility for adding to the number of cells from the number of cells outlined above to fix breaks in the heat intensity levels at lower values of $y$, for formulating processing heat level and time interval-wise as necessary, for various purposes or results, and for various blend mixes as it provides strict adherence to the predetermined formula for which the controls are preset.

If a ten degree differential between the initial, or maximum, temperature level, and the ending, or minimum temperature level, is used, it is intended that the initial or maximum temperature level be set at 5 degrees F. above the temperature level stated for each cell, and the minimum or ending temperature level be set at five degrees below this stated level.

FIG. 21 is an expanded cross-sectional view of one cell 199 as shown in FIG. 17, with fan 8 positioned therein as well as air return channels 201 and 202 going to respective heating jackets 7, with garments 211 positioned to suspend on hangers from conveyor rods 212, each rod with the roller at each edge held in supporting rail 213 along each side wall of each heating cell, where these cross rods are linked together with sprocket chain 214 (or 215), as shown in the vertical or top view of section of conveyor in FIG. 20, as is shown operable in perspective view of the interior of each cell 199 as shown in FIG. 22.

FIG. 19 shows a consolidated space arrangement for an arrangement of four cells abutting transversely as shown in FIG. 18, with the side walls removed and space for air channels at each edge of the resulting structure, and with four axial type fans operating contiguously through fan plate 103.

The cell arrangement stage by stage, increases in heat, pick up again on even heat dispersed and instant response cell by cell arrangement providing two valuable flexibilities.

(1) In changing value of y for internal purpose results.

(2) Together with compound sensing designed heat volume for the required heat volume for goods as they are in each cell, each instant clearance designed again to change with garment weight and size as soon as changed garments reach sensing space.

As to the physical resin bend slight period at each receding heat levels allows a brief seasoning period in each cell for newly formed physical blend bend.

Heat treatment may be rendered by a tempering method to metals, ceramics, wood, laquers etc., either in fabricated objects or piece materials in a method to prevent unintentional or accidental underheating or overheating by use of an individual compound sensing and heat control system in each of several subdivisions of a heat treatment oven-like over structure, wherein each such subdivision is positioned in a series arrangement with other such subdivisions in such a manner that procedurally predetermined stages of heat treatment may be effected in an ascension of heat intensities, an individual intensity for each such subdivided space, where each such space serves to preheat the product, which is moved through the succession of subdivided spaces on a slideable conveyor, preparatory to receiving a higher heat intensity in the next succeeding subdivision, until lowest product peak heat stage is reached, then holding peak heat stage in a time cycle according to the number of subdivision spaces required at a given rate of travel therethrough by conveyor system to complete peak heat treatment, and thereafter deheating product in descending stages, one subdivision for each deheating stage until the product is brought back to room temperature. With sensors located in the terminal portion of product travel path in each subdivided space to control on temperature differentials as set, for product heating at control point, sensors extend dynamic control in a manner as follows; even heat generation as controlled for product heat condition at point of control, where sensors are located, to impart to product units moving from entrance into unit structure, or subdivision, to point of sensor location, heat at an even volume although product heat is gradually building up therefrom in its movement through the structure, wherein said even heat supply forces environmental temperature, of the air medium, upward in a gradual manner along with, and just above, that of the gradually rising product heat level, thus to transfer heat evenly and in a tempering manner to said moving product units. Temperature and heat levels may be used as required up to the limit of heat levels for which the fan operation and transmission of heat by air or other vapors can be made to function. Many such uses as baking pottery, heat treating aluminum, drying and baking paints, and enamels, or various types of steel products may be accomplished at greater precision of heat control and at improved efficiencies otherwise such as adequate heat treatment in a shorter over-all time period, less shrinkage and other imperfections and may be accomplished in a manner as described above for textile garments and products. Where heat and temperatures required may be for 1000 degrees F. or higher, special steels and alloys may be used for fan materials sufficient to withstand higher temperatures, and special metal or alloy or ceramic materials may be used for inner surfaces, baffles, etc. Certain specialized types of thermocouplings, and/or bellows type thermostats may be substituted for thermistors as sensing elements. Various types of insulating materials suitable for higher heat levels may be used, such as ceramic or refractory insulating materials for inner surfaces, in combination with special type of glass in bubble form, where the objective is both to conserve heat within the enclosure and to protect the temperature in the room in which oven structure is located.

The compound sensing system for regulating both the flow of air and the volume of heat generated, for initial and ending temperatures of the air flow as it is to pass around heat treatment objects and transmit heat thereto may be used where heat generation occurs from the combustion of gas or other fluid fuels, but particularly gas, by substituting for the program switch as shown in FIG. 10, as used to switch in and out circuits of heaters to raise or decrease the amount of heat being generated from electric heating elements, a turn valve operation as shown at the right side in FIG. 10, where the opening and closing of the turn-valve is accomplished as impelled by control motor 23, as it turns pinion gear 46 to turn in one direction and move ring gear 34 in a counterclockwise direction to open the valve and increase the volume of fuel gas being supplied to gas burners, and thus increase the amount of heat being generated therefrom, and as motor 23 turns or rotates in the other direction to move ring gear 34 in a clockwise direction and thus decrease or close the volume of fuel gas permitted to flow through to burning jets, and thus decrease the amount of heat being generated therefrom.

Valve action is impelled in a manner as follows: two fingers 47 protrude from ring gear 34 through holes in the valve wheel which holes fit over said fingers 47 in a slideable manner and positioned to turn valve stem 48 in either direction on an axis which is common with that of ring gear 34, where valve stem 48 opens and closes fluid screw valve, thus increasing and decreasing and cutting off fuel flow, all from operations as described in the foregoing for operation of program switch shown also in FIG. 10. Provision must be made for metal housings enclosing burning jets to include also fuel and air (to support combustion) through pipes, and space sufficient for gas fired combustion to take place and thus transmit heat to metal surface of housing, and where housing is to be provided with sufficient exhaust ports and piping therefrom to conduct exhaust fumes out of, and away from the housing in which the combustion occurs. Provision must also be made for even heat generation from jets, one linear inch with another linear inch of the housing enclosing combustion and components in support thereof, and for heat generating jets to run the entire length of said metal housing containing combustion effects, where said housing must be inserted to run the entire length of heating jackets 7 as shown in FIG. 7 or heating jacket 14 as shown in FIG. 11 and FIG. 12, and must provide for even passageway for air around between housing and inner surfaces of heating jacket. And provisions must be made, also for fuel feed to each of plural metal housings as inserted in plural, heating jackets operative in one heating level to be even, one housing with that of another, so that an even flow of uniformly heated air will obtain through each respective combustion housing involved in one level.

I claim:

1. A procedure for overcoming erroneous and inefficient heat treatment of materials such as deferred curing of textile garments and piece goods, metal, wooden, lacquered surfaces, ceramic, and other objects or materials, where it is known that the product heat of materials undergoing heat treatment should be brought up to the last level equal to that of the environmental temperature level which is used to impose the heat treatment upon said material without uncontrolled underheating and overheating said material in the process, and where the application of such product heat should be made in a gradual manner in order to hold peak heat level to the minimum level required for given results, consisting in employing two or more plural heating units arranged in series in a continuous manner, employing a slideable conveyor extended through said heating unit structures, actuated by a variable speed motor drive, and where in the first heating unit structure or any given number of said heating unit structures, heat generation and air flow is temperature responsively controlled in a compound sensing manner, said sensing control being arranged to bring the product heat up, in each said sensing control being arranged to bring the product heat up, in each said structure, from that delivered by the last successive heating unit structure or from outside ambient temperature as the product enters the first heating unit structure in the next succeeding one of the heating unit structures for maintaining peak heat level, set to control for a minimum temperature at or near the peak level with fan speed manually set to a nominal speed, equal approximately to that of the next preceding heating unit, and the movement of material and heat treatment allowed to operate, wherewith the fan speed or air flow being constant, the maximum temperature allowed to vary according to the amount of the heat needed, where maximum heat level will therefore be at a differential only slightly higher than that set in the sensors for the minimum temperature, to supply the relatively low amount of heat necessary to maintain for slight leakage loss and for final inward absorption of heat by materials, said upward differential above minimum heat level at or near peak heat level being decreasable by increasing the fan speed; the function of the two or more plural heating units being to bring the material up to peak heat level in the first heating unit from that delivered from pre-heat heating units and, in the next succeeding unit, or units, to maintain the approximate peak heat for any given amount of time for any given heat treatment purpose, with flexibility for readjusted heat generation input at intervals where so desired or required, with one said readjustment possible for each unit used subsequent to the first peak heat heating unit; all of which is effected by placement of sensors for minimum temperature at terminal space of material in each such said heating unit.

2. A procedure for cooling down piece materials subsequent to heat treatment according to claim 1, said procedure being operable by use of one, or plural two or more units, oven-like in structure, except that in each individual such unit front and back casings are removed therefrom, and with heat generating effects likewise removed therefrom with said unit, abutting at one end and in a contiguous manner with the last succeeding heat treatment unit, either build-up unit with the chain link or other type conveyor connectedly extending in a continuous manner through said cooling unit or units as propelled by same driving motor as operable for a conveyor operable for conveyor through all heat treatment and cooling unit or units; cooling unit operable further with a temperature responsively by a variable speed motor driving axial type fan located across the top square of the interior of structure unit, and pulling air at room temperature in through intake ports located through the bottom structure casing, and exhausting said air through exhaust ports located through the top casing of the structure, connectedly operable with piping means to remove said exhaust air appropriately, as materials move conveyor transported through said structure unit; with sensor units operable for controlling the fan speed in the same manner as for compound sensing for controlling air flow and heat generation, except that in the cooling units sensors controlling fan speed only are located in the path of air flow after it has passed the materials and has received heat therefrom with said sensors being located in the terminal of the travel path of materials undergoing cooling within the structure unit, the procedural cooling operation being up to and by stages, if plural structure units are used, or near, the peak heat level, and wherein thereafter in the next succeeding one or ones of the heating unit structures employed to maintain the peak heat level for any given time period necessary for chemical bonding of textiles, tempering, drying or other physical or chemical process, for which the heat treatment is intended, to be completed, the heat controls consist only of a sensing control for minimum temperature, as the temperature responsively controlling the volume of heat being generated, which now is necessary only to supply the amount of heat leaking through the insulation, plus the amount of heat being drawn, in a gradual manned, to bring the inmost folds and crevices, and center spaces of the product or material undergoing heat treatment not yet brought up to peak heat level, up to the peak heat level, employing a variable motor driven fan by which flow of air may be regulated, said procedure being operable in the following manner, that the compound sensing set in the first heating unit structure or structures for maximum temperature at or just above the peak heat level or in stages by units if two or more heating unit structures are used to heat the product, and minimum sensors set for slight differential below that of the maximum temperature in each respective heating unit structure setting, with said sensors being placed at the terminal point of the product or material travel within said unit structure or respective structures, the function of the heat input in each said heating unit structure or structures being to bring the product heat up from the level at which it is delivered by the last succeeding heating unit structure, or from outside the structure, up to or near, that as set for the minimum temperature in this unit structure, with the sensors control for materials to be received at the product heat existing as leaving the last preceding heat treatment or cooling unit, and to cool from air flow as controllable at any given temperature setting, at or above room temperatures, the stage by stage cooling providing one stage of sequential cooling for each such cooling unit so used.

3. A procedure for overcoming erroneous and inefficient heat treatment of materials such as deferred curing of textile garments and piece goods, metal, wooden, lacquered surfaces, ceramic, and other objects or materials, where it is known that the produce heat of materials undergoing heat treatment should be brought up to the last level equal to that of the environmental temperature level which is used to impose the heat treatment upon said material without uncontrolled underheating and over-heating said material in the process, and where the application of such product heat should be made in a gradual manner in order to hold peak heat level to the minimum level required for given results, consisting in applying heat in a gradual manner to products moving through a heating unit structure, undergoing heat treatment using a compound sensing control system, with a sensor assembly located in the terminal portion of the path of the product travel through said heating unit structure, wherein an even volume of heat is applied to said product or product units, with a gradual rise in product here therefrom as the product units move progressively therethrough, and dynamically raise the environmental temperature of the air medium gradually, at a level just higher than that of the gradually rising product heat, to force heat transfer continuously to gradually increasing product heat, with said gradually rising environmental temperature and even heat volume transfer to the product effecting a tempering method for heating said products or product units.

References Cited

UNITED STATES PATENTS

| | | | |
|---|---|---|---|
| 2,411,712 | 11/1946 | Joyce | 34—207 |
| 3,214,566 | 10/1965 | Wilson | 219—400 |
| 3,259,994 | 7/1966 | Klinkmueller et al. | 34—26 |
| 3,262,216 | 7/1966 | Dugger | 34—26 |
| 3,368,062 | 2/1968 | Gramenius et al. | 219—400 |

VOLODYMYR, Y. MAYEWSKY, Primary Examiner

U.S. Cl. X.R.

34—222; 38—144; 219—400, 413

UNITED STATES PATENT OFFICE
CERTIFICATE OF CORRECTION

Patent No. 3,529,358        Dated September 22, 1970

Inventor(s) Aubrey C. Robinson

It is certified that error appears in the above-identified patent and that said Letters Patent are hereby corrected as shown below:

In the heading to the printed specification, line 4, after "Ga." cancel "assignor to C. Terrot Sohne, Stuttgart Bad Cannstatt, Germany, a firm".

Signed and sealed this 29th day of June 1971.

(SEAL)
Attest:

EDWARD M. FLETCHER, JR.
Attesting Officer

WILLIAM E. SCHUYLER, JR.
Commissioner of Patents